(12) United States Patent
Hara et al.

(10) Patent No.: US 8,385,021 B2
(45) Date of Patent: Feb. 26, 2013

(54) TEMPERATURE ASSISTED MAGNETIC RECORDING ELEMENT HAVING GROUNDED NEAR FIELD LIGHT GENERATOR

(75) Inventors: Shinji Hara, Tokyo (JP); Tsutomu Chou, Tokyo (JP); Yoshihiro Tsuchiya, Tokyo (JP)

(73) Assignee: TDK Corporation, Tokyo (JP)

( * ) Notice: Subject to any disclaimer, the term of this patent is extended or adjusted under 35 U.S.C. 154(b) by 286 days.

(21) Appl. No.: 12/722,742

(22) Filed: Mar. 12, 2010

(65) Prior Publication Data

US 2011/0222190 A1    Sep. 15, 2011

(51) Int. Cl.
*G11B 5/31*    (2006.01)
*G11B 5/02*    (2006.01)

(52) U.S. Cl. .............. 360/125.31; 360/59; 360/128
(58) Field of Classification Search ............ 360/59, 360/125.31, 125.74, 128
See application file for complete search history.

(56) References Cited

U.S. PATENT DOCUMENTS

| | | | |
|---|---|---|---|
| 6,160,688 A * | 12/2000 | Okumura | 360/323 |
| 6,775,101 B2 | 8/2004 | Satoh et al. | |
| 7,330,404 B2 | 2/2008 | Peng et al. | |
| 7,454,095 B2 | 11/2008 | Baehr-Jones et al. | |
| 2005/0174687 A1* | 8/2005 | Edelman et al. | 360/128 |
| 2007/0139818 A1* | 6/2007 | Shimazawa et al. | 360/59 |
| 2008/0002298 A1 | 1/2008 | Sluzewski | |
| 2008/0171232 A1 | 7/2008 | Aoki et al. | |
| 2008/0204916 A1 | 8/2008 | Matsumoto et al. | |
| 2009/0201600 A1 | 8/2009 | Komura et al. | |
| 2011/0058272 A1* | 3/2011 | Miyauchi et al. | 360/59 |
| 2011/0205860 A1* | 8/2011 | Chou et al. | 360/59 |

FOREIGN PATENT DOCUMENTS

| | | |
|---|---|---|
| JP | A-H06-168413 | 6/1994 |
| JP | A-2008-171509 | 7/2008 |
| JP | A-2008-257819 | 10/2008 |
| JP | A-2009-187645 | 8/2009 |

* cited by examiner

*Primary Examiner* — Craig A. Renner
(74) *Attorney, Agent, or Firm* — Posz Law Group, PLC

(57) ABSTRACT

A plasmon generator positioned away from the substrate and extending to the air bearing surface (ABS) as facing a part of the waveguide. The plasmon generator has a propagation edge extending in a longitudinal direction. The propagation edge has an overlapping part overlapping the waveguide in the longitudinal direction, and a near field light generator positioned on the ABS and located in the vicinity of the edge part of the recording magnetic pole. The overlapping part of the propagation edge is coupled with the laser light propagating through the waveguide in a surface plasmon mode so that a surface plasmon is generated. The propagation edge propagates the surface plasmon generated in the overlapping part to the near field light generator. The magnetic recording element further has a grounding element electrically connecting the plasmon generator and the substrate.

10 Claims, 9 Drawing Sheets

TEMPERATURE ASSISTED MAGNETIC RECORDING ELEMENT HAVING GROUNDED NEAR FIELD LIGHT GENERATOR

BACKGROUND OF THE INVENTION

1. Field of the Invention

The present invention relates to a magnetic recording element used in a hard disk device, and especially to a temperature assisted magnetic recording element (or thermally-assisted type magnetic recording element).

2. Description of the Related Art

In recent years, based on demand for high recording density, improvement in the performance of a thin film magnetic head and a magnetic recording medium has been required in magnetic recording devices such as a hard disk device. A composite-type thin film magnetic head has widely been used for the thin film magnetic head. The composite-type thin film magnetic head includes a reproducing head having a magneto resistive (MR) element for reading and a recording head having an induction-type magnetic conversion element (a magnetic recording element) for writing, with both heads being laminated on a substrate. In the hard disk drive, the thin film magnetic head is disposed on a slider that flies slightly above a surface of the magnetic recording medium.

The magnetic recording medium is a discontinuous medium on which magnetic microparticles gather. Each of the microparticles has a single magnetic domain structure. In the magnetic recording medium, one recording bit is structured with a number of magnetic microparticles. In order to increase the recording density, asperity of a boundary between adjacent recording bits needs to be small. For this, the size of the magnetic microparticles needs to be decreased. However, when the size of the magnetic microparticles is decreased, the volume of the microparticles decreases. Accordingly, thermal stability of magnetization of the magnetic microparticles also decreases. In order to solve this problem, increasing anisotropic energy of the magnetic microparticles is effective. However, when the anisotropic energy of the magnetic microparticles is increased, the coercive force of the magnetic recording medium is also increased. As a result, it becomes difficult to record information by a conventional magnetic head. Conventional magnetic recording has such a trilemma, and this is a large obstacle to achieving an increase in the recording density.

To solve this problem, one method known as thermally-assisted magnetic recording (temperature assisted magnetic recording) is proposed. In this method, a magnetic recording medium having a large coercive force is used. The magnetic field and heat are simultaneously added to a part of the magnetic recording medium where information is recorded. With this method, the temperature of the part where the information is recorded is increased. Therefore, the coercive force decreases, and the information is able to be recorded.

In thermally-assisted magnetic recording, a method using near field light is known as a method to heat to the magnetic recording medium. The near field light is a type of electromagnetic field that is generated around a substance. Ordinary light cannot be focused to a region that is smaller than its wavelength due to diffraction limitations. However, when light having an identical wavelength (coordinated wavelength) is irradiated on to a microstructure, near field light depending on the scale of the microstructure is generated, it enabling the light to be focused on to a minimal region, such as a region only tens of nm in size. As a practical method to generate the near field light, a method using a plasmon antenna is generally known. The plasmon antenna is a metal that is referred to as a near field light probe that generates near field light from plasmon excited by light.

Direct irradiation of light generates the near field light in the plasmon antenna. However, with this method, a conversion efficiency to convert irradiated light into near field light is low. Most of the energy of the light that is irradiated on the plasmon antenna is reflected by the surface of the plasmon antenna or is converted into thermal energy. The size of the plasmon antenna is set to be no more than the wavelength of the light. Accordingly, the volume of the plasmon antenna is small. Therefore, the temperature of the plasmon antenna significantly increases according to the above-described generation of heat.

Because of the temperature increase, the volume of the plasmon antenna expands, and the plasmon antenna protrudes from an air bearing surface (ABS) that is a surface opposite to the magnetic recording medium. Accordingly, the distance of an edge part of the MR element positioned on the ABS from the magnetic recording medium increases, causing a problem. The problem is that servo signals recorded in the magnetic recording medium are barely sensed during the recording process.

Currently, a technology that does not directly irradiate light to the plasmon antenna is proposed. For example, the specification of U.S. Pat. No. 7,330,404 discloses such a technology. The technology is that light propagating through a waveguide such as an optical fiber is coupled in a surface plasmon polariton mode through a buffer portion to a plasmon generator so that the surface plasmon is excited on the surface of the plasmon generator. The plasmon generator has a near field light generator that is positioned on the ABS and that generates the near field light. At the interface between the waveguide and the buffer portion, the light propagating through the waveguide is totally reflected. However, at the same time, light penetration to the buffer portion is generated, which is referred to as evanescent light. When the evanescent light and collective oscillation of electric charges in the plasmon generator are coupled, the surface plasmon is excited in the plasmon generator. The excited surface plasmon propagates to the near field light generator along the plasmon generator, and generates the near field light at the near field light generator. According to this technology, the light propagating through the waveguide is not directly irradiated to the plasmon generator so that the excessive temperature increase of the plasmon generator can be prevented.

In an element, such as the magnetic recording element, formed by a thin film process, the waveguide is formed as a long and narrow member having a rectangular cross section. The waveguide is a core of the rectangular cross section, and the waveguide is covered by a clad. In some cases, the waveguide includes a member such as a spot-size converter to focus laser light. Moreover, the combination of the waveguide, the clad, the spot-size converter and the plasmon generator is referred to as a near field light generation element (or near field light generator).

The ABS is formed on the thin film magnetic head by a lapping process. During the lapping process, the thin film magnetic head stores static electricity. When the stored static electricity is discharged, generation of heat occurs due to the discharging. Similarly, during the production of a head gimbal assembly and the cutting of a wafer into a row bar, the static electricity is stored in the vicinity of the ABS. Accordingly, a similar phenomenon may occur. The plasmon generator is, generally, made of Au, Ag, Cu, Al, Pd, Ru, Pt, Rh, Ir or an alloy that is primarily composed of these metals. These metals have a large surface tension. Therefore, the generation of heat caused by the discharge of the static electricity causes grain growth (agglomeration) of these metal materials. Due to the grain growth, it is difficult to maintain a shape of the plasmon generator that is formed during wafer formation on the order of a nano-meter level, which significantly affects the generating efficiency of the near field light.

In a plasmon generator using evanescent light penetrated from the waveguide, a certain distance (length that the waveguide and the plasmon generator are overlapped) is required for coupling the plasmon. As a result, the volume of the plasmon generator tends to be larger than a volume of the plasmon antenna type plasmon generator. In other words, the plasmon generator using evanescent light tends to more store static electricity than the conventional plasmon antenna.

The objective of the present invention is to provide a magnetic recording element that restrains storage of static electricity and that decreases the deformation of a shape of the plasmon generator due to the discharge of the static electricity. Also, the objective of the present invention is to provide a slider, a head gimbal assembly, a hard disc device, and the like that include the above-described magnetic recording element.

SUMMARY OF THE INVENTION

A magnetic recording element of the present invention has a substrate, a main pole for recording that includes an edge part positioned on an ABS, a waveguide through which a laser light propagates, and a plasmon generator. The plasmon generator is positioned away from the substrate and extends to the ABS as facing a part of the waveguide. The plasmon generator has a propagation edge extending in a longitudinal direction. The propagation edge has an overlapping part overlapping the waveguide in the longitudinal direction, and a near field light generator positioned on the ABS and located in the vicinity of the edge part of the recording magnetic pole. The overlapping part of the propagation edge is coupled with the laser light propagating through the waveguide in a surface plasmon mode so that a surface plasmon is generated. The propagation edge propagates the surface plasmon generated in the overlapping part to the near field light generator. The magnetic recording element further has a grounding element electrically connecting the plasmon generator and the substrate.

The plasmon generator is electrically connected to the substrate with the grounding element. In other words, since the plasmon generator is grounded, the static electricity generated during a lapping process flows into the substrate, and this prevents the static electricity from being stored in the plasmon generator. Therefore, generation of heat of the plasmon generator, caused by the discharge of the static electricity, is prevented, and the shape of the plasmon generator can more likely be maintained.

The above-mentioned object, as well as other objects, characteristics, and advantages of the present invention will be described below with reference to attached drawings illustrating an embodiment(s) of the present invention.

DETAILED DESCRIPTION OF THE INVENTION

Figure 1:
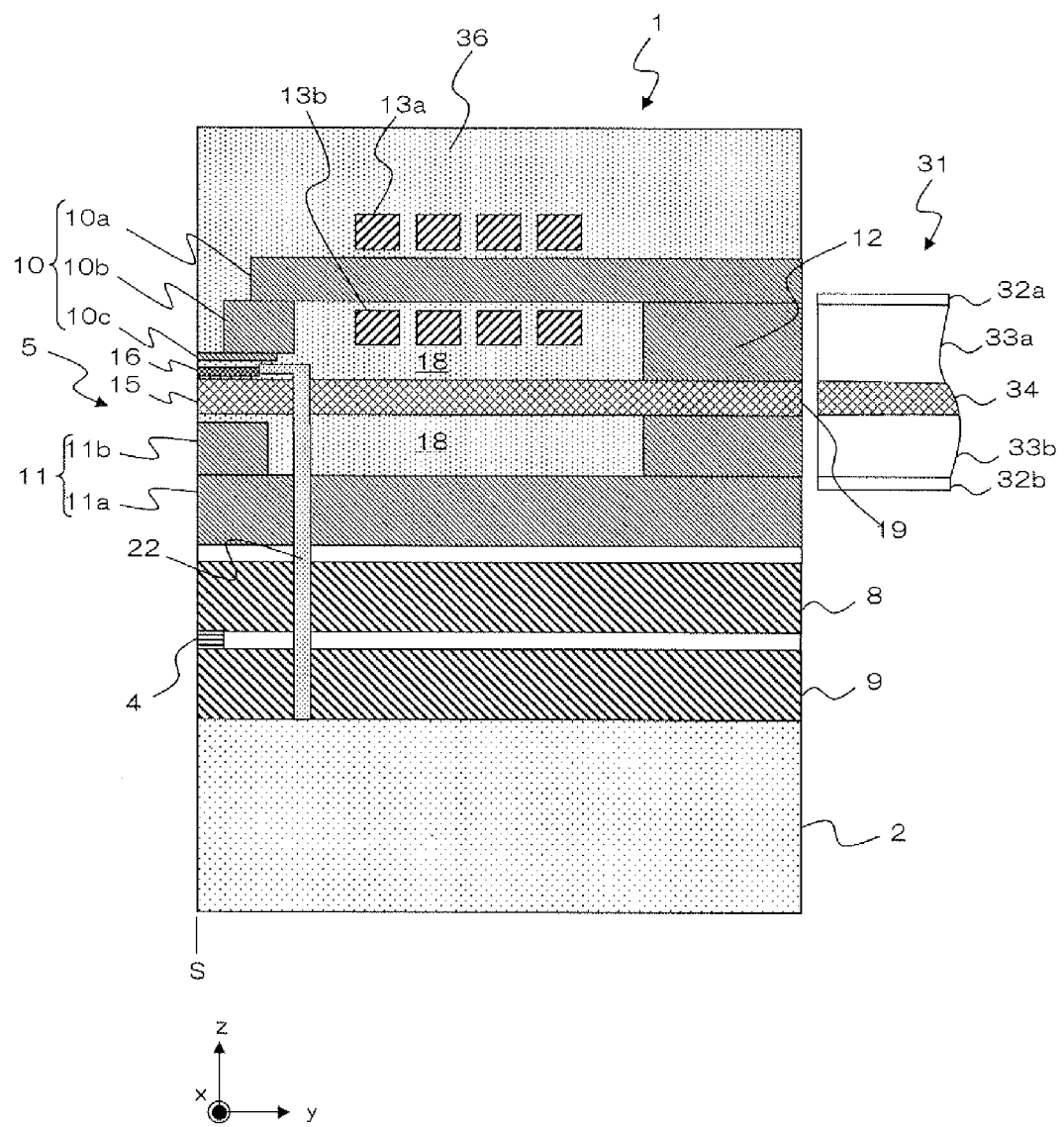
FIG. 1 is a main part sectional view of a slider including a magnetic recording element of the present invention.

A magnetic recording element of the present invention is explained with reference to the drawings. FIG. 1 is a main part sectional view of a slider including a magnetic recording element of the present invention. The slider 1 is configured such that an MR element 4 and a magnetic recording element 5 are layered on a substrate 2. The substrate 2 is made of ALTIC ($Al_2O_3$—TiC). The MR element 4 is configured as a reproducing head part. The magnetic recording element 5 is configured as a recording head part. Hereafter, a "lamination direction" means a film formation direction in wafer processing and corresponds to the z-direction in each drawing. An "upward lamination direction" means a direction toward an overcoat layer 36 from the substrate 2, and a "downward lamination direction" means a direction toward the substrate 2 from the overcoat layer 36.

The slider 1 has, as a reproducing part, the MR element 4, an upper shield layer 8, and a lower shield layer 9. The MR element 4 is positioned such that a tip part is exposed to an ABS S.

The upper shield layer 8 and the lower shield layer 9 are disposed in a manner of sandwiching the MR element 4 from upper and lower sides of the lamination direction. The MR element 4 can be configured in various structures applied with various magneto resistive effects such as, for example, a CIP (Current In Plane)—GMR (Gigantic Magneto Resistive) element in which a sense current flows in a direction parallel to a film surface, CPP (Current Perpendicular to Plane)—GMR (Gigantic Magneto Resistive) element in which a sense current flows in a direction perpendicular to the film surface (the laminating direction), and a TMR (Tunneling Magneto Resistive) element in which a tunneling effect is used. When the CPP—GMR element and the TMR element are applied, the upper shield layer 8 and the lower shield layer 9 also function as electric poles that supply the sense current.

The slider 1 also has a so-called magnetic recording element 5 for perpendicular magnetic recording, which is configured as the recording head part. The magnetic recording element 5 has a main magnetic pole layer 10 (hereafter, referred to as a main pole) for recording. The main pole 10 has a first main part 10a, a second main part 10b and a magnetic pole tip part 10c. These parts are formed from, for example, an alloy made of two or three of Ni, Fe, and Co. A return shield layer 11 is disposed in the downward lamination direction of the main pole 10. The return shield layer 11 has a first main body part 11a and a second main body part 11b, and these parts also are formed from, for example, an alloy made of two or three of Ni, Fe, and Co. The main pole 10 and the return shield layer 11 are magnetically linked at a contact part 12 to each other. In the present embodiment, the return shield layer 11 is disposed in the downward lamination direction of the main pole 10, but can be also disposed in the upward lamination direction of the main pole 10. In the upward lamination direction, the overcoat layer 36 made of $Al_2O_3$ is disposed above the main pole 10.

In the periphery of the main pole 10, coils 13a and 13b are disposed in a spiral manner around the contact part 12. Due to a current applied from an external device to the coils 13a and 13b, a magnetic flux is generated to the main pole 10. The coils 13a and 13b are made of a conductive material such as Cu. In the present embodiment, the coils 13a and 13b are disposed in two layers, but these layers may be configured as a single layer or more than two layers. Also, the number of windings is four in the present embodiment, but the number is not limited to this embodiment.

Figure 2:
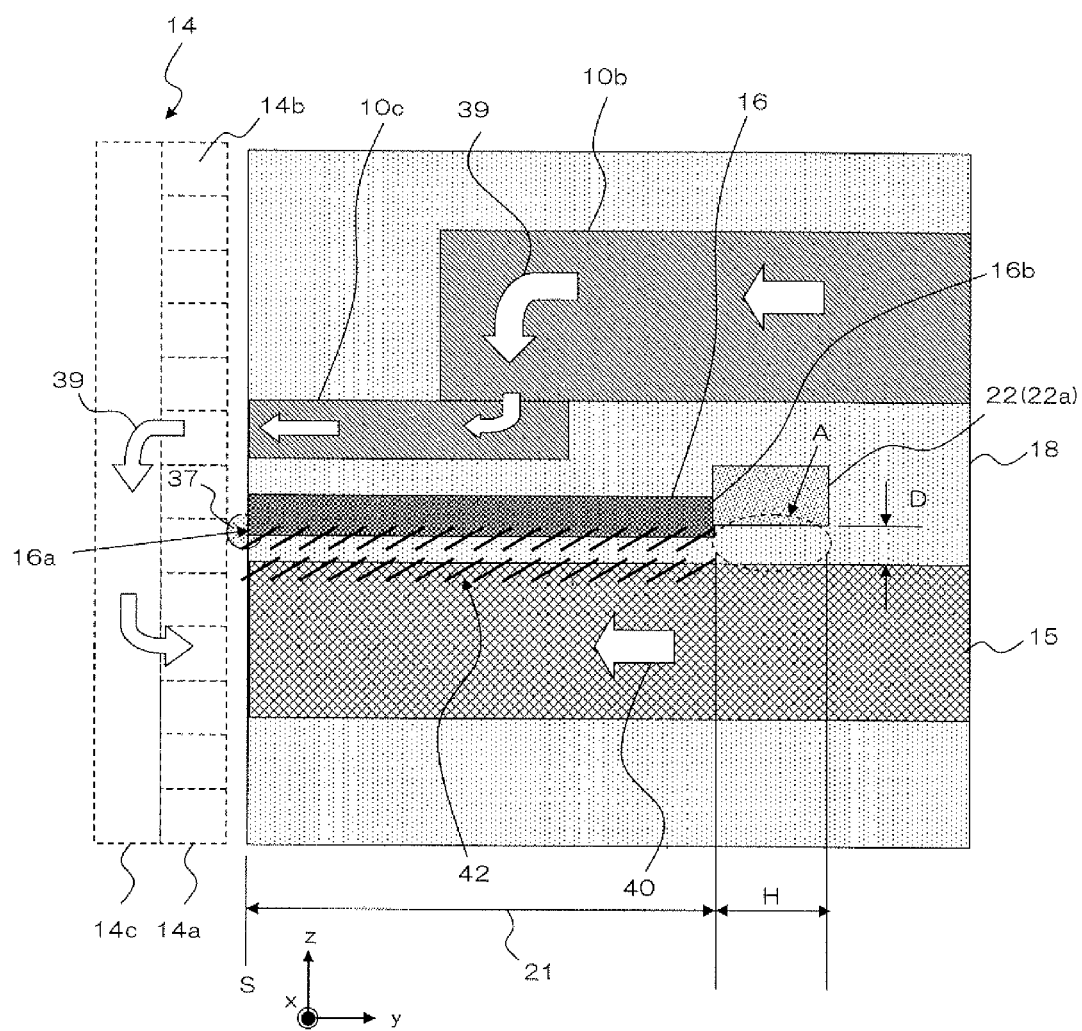
FIG. 2 is an enlarged view of the vicinity of the magnetic recording element of the slider shown in FIG. 1.

The main pole 10 is narrowed not only in a film surface orthogonal direction (z direction) but also in a track width direction (x direction) at the magnetic pole tip part 10c in the vicinity of the ABS S. Referring to FIG. 2, the magnetic flux 39 generated within the main pole 10 is narrowed as traveling to the ABS S. The magnetic flux 39 is emitted from the magnetic pole tip part 10c positioned on the ABS S to the magnetic recording medium 14. The magnetic flux 39 is minute and strong enough for writing, and corresponds to the high recording density. The magnetic recording medium 14 has a configuration for perpendicular magnetic recording. A surface layer of the magnetic recording medium 14 is a recording layer 14a. The magnetic flux 39 emitted from the magnetic pole tip part 10c travels through the recording layer 14a in a perpendicular direction, and magnetizes each recording bit 14b of the recording layer 14a in the perpendicular direction (y direction). The magnetic pole 39 passes through the recording layer 14a, changes direction into an in-plane direction (z direction) of the magnetic recording medium 14 in an under layer 14c made of soft magnetic material, changes direction again in the perpendicular direction (y direction) in the vicinity of the return shield layer 11, then is absorbed by the return shield layer 11. Namely, the return shield layer 11 functions to control the magnetic flux so that the magnetic flux 39 perpendicularly passes through the recording layer 14a and then completes a U-shape magnetic path of travel.

The second main part 11b of the return shield layer 11 forms a trailing shield part. The training shield part has a layer cross-section that is larger in the track width direction (x direction) than the first main part 11a. The return shield layer 11 forms a magnetic gradient between the return shield layer 11 and the main pole 10 that is precipitous in the vicinity of the ABS S. As a result, signal output jitter is small, and an error rate on reading is small.

Referring to FIG. 1, a waveguide 15 and a plasmon generator 16 are disposed between the main pole 10 and the return shield layer 11. A clad layer 18 is disposed around the waveguide 15 in a manner of surrounding the waveguide 15. The waveguide 15 is a core having a higher refractive index than that of the clad layer 18. The laser light 40 propagates through the waveguide 15 toward the ABS S as the laser light 40 totally reflects at the interface of the waveguide 15 and the clad layer 18. The laser light 40 enters from the light source 31 that is described below. When the laser light 40 has a wavelength of 600 nm, the clad layer 18 can be made of, for example, $SiO_2$, and the waveguide 15 can be made of, for example, $Al_2O_3$. When the clad layer 18 is made of $Al_2O_3$, the waveguide 15 can be made of, for example, TaOx. When the laser light has a wavelength of 800 nm, the clad layer 18 can be made of, for example, $Al_2O_3$, and the waveguide 15 can be made of, for example, TaOx. The term TaOx here means a tantalum oxide of arbitrary composition that is typically $Ta_2O_5$, TaO or $TaO_2$, but is not limited to these examples. The waveguide 15 extends to a back surface 19 of the slider 1 in order to connect the light source 31. In the present embodiment, the waveguide 15 extends to the ABS S and penetrates the slider 1, but the waveguide 15 also can be terminated in the middle on the ABS S side. Although omitted in the drawing, the clad layer 18 is disposed between the waveguide 15 and the contact part 12.

Figure 3A:
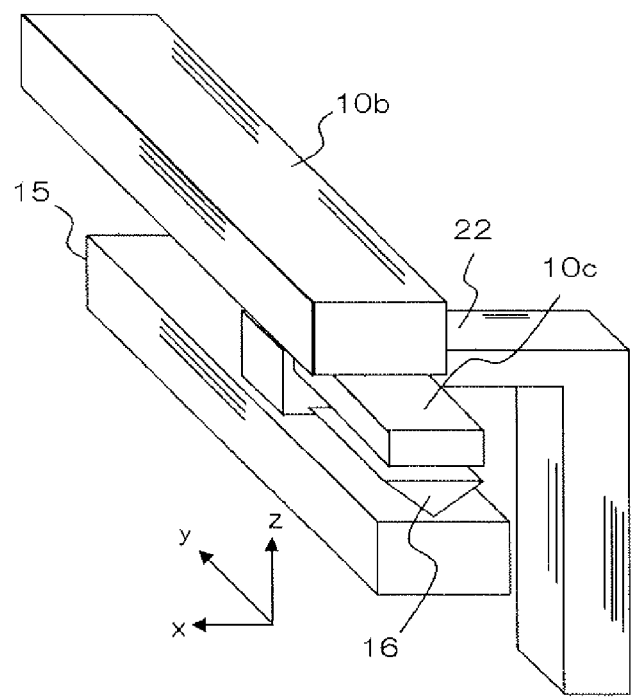
FIG. 3A is a perspective view (a main pole is shown) of the vicinity of the magnetic recording element of the slider shown in FIG. 1.
Figure 3B:
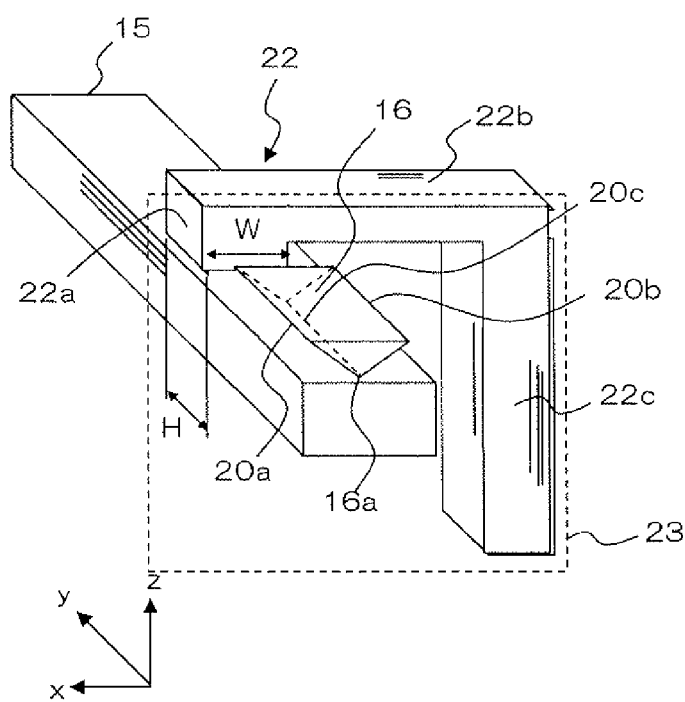
FIG. 3B is a perspective view (the main pole is not shown) of the vicinity of the magnetic recording element shown in FIG. 1.
Figure 4A:
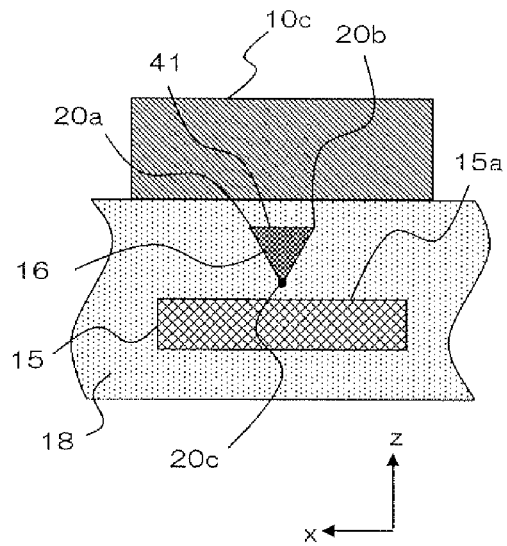
FIGS. 4A through 4D are sectional views showing various embodiments of a plasmon generator.

The plasmon generator 16 is positioned away from the substrate 2, and extends to the ABS S as facing one part of the waveguide 15. The plasmon generator 16 is formed by Au, Ag, Cu, Al, Pd, Ru, Pt, Rh, Ir, or an alloy that is primarily composed of these metals. FIG. 3A is a perspective view of the vicinity of the magnetic recording element, in which the part of the main pole is drawn. FIG. 3B is a perspective view of the vicinity of the magnetic recording element, in which the main magnetic pole is omitted in order to clearly depict the plasmon generator and the grounding element that is described later. Also, FIG. 4A is a cross-sectional view in the X-Z plane of the plasmon generator and the waveguide. As shown in these drawings, the plasmon generator 16 is a metallic part with a substantially triangular prism shape having triangular cross sections. Specifically, with reference to FIG. 3B, each of three vertices of the triangular cross section of the plasmon generator 16 respectively forms three edges 20a, 20b, and 20c. The three edges 20a, 20b, and 20c extend in a longitudinal direction (y direction) of the plasmon generator 16. As mentioned above, the plasmon generator 16 is formed so that one of the vertices of the triangular cross section is opposite to the waveguide 15. The vertex forms a propagation edge 20c that is opposite to the waveguide 15 (or facing the waveguide 15). Referring to FIG. 4A, in three sides of the triangular cross section, a side 41 not facing the waveguide 15 is approximately parallel to a lamination direction upper surface 15a of the waveguide 15. Hereafter, the triangular cross section shown in FIGS. 3A, 3B, and 4A-4D may be referred to as an inverted triangular cross section.

The plasmon generator 16 extends substantially parallel with the waveguide 15 and in a perpendicular direction with respect to the ABS S. The plasmon generator 16 does not extend to the back surface 19 of the slider 1. The waveguide opposite propagation edge 20c has an overlapping part 21 that overlaps with the waveguide 15 in the longitudinal direction (y direction) of the plasmon generator 16. The overlapping part 21 couples with the laser light 40 that propagates through the waveguide 15 in a surface plasmon mode, and generates a surface plasmon 42. A near field light generator 16a is formed at the edge part of the ABS S side of the plasmon generator 16. The near field light generator 16a is positioned in the vicinity of a magnetic pole tip part 10c on the ABS S. The propagation edge 20c causes the surface plasmon 42 that is generated in the overlapping part 21 to propagate to the near field light generator 16a along the propagation edge 20c. The near field light 37 is generated at the near field light generator 16a. As mentioned above, when information is recorded, heat and a magnetic field are simultaneously provided to a part of the magnetic recording medium 14, on which the information is recorded. Therefore, the temperature of the part for recording the information is increased, and the coercive force is lowered, enabling the information to be recorded.

The plasmon generator 16 is electrically connected to the substrate 2 by a grounding element 22. The grounding element 22 is made of a conductive material, such as Ta, W, Fe, Ni or Cr. Therefore, with this configuration, the plasmon generator 16 and the substrate 2 are substantially maintained to be equipotential, and the static electricity generated in the plasmon generator 16 in the lapping process flows to the substrate 2. As discussed later, in the lapping process, a row bar that is cut out from a wafer is defined as a unit of the lapping process. Then, since the row bar is grounded through a supporting member, the static electricity flowing into the substrate 2 eventually reaches to ground. Accordingly, accumulation of static electricity in the plasmon generator 16 is prevented. As a result, the heat generation of the plasmon generator 16 caused by discharging the static electricity is prevented, and the shape of the propagation edge 20c, contributing especially to the plasmon coupling, is maintained in a nanometer range.

The grounding element 22 is electrically connected to the plasmon generator 16 on an edge surface 16b that is on the opposite side of the ABS S of the plasmon generator 16. On an in-plane 23 that is perpendicular to the longitudinal direction (y direction) of the plasmon generator 16, the grounding element 22 extends to the substrate 2 in a multi-directional configuration (or as changing its direction) and separates from the plasmon generator 16. Specifically, as shown in FIG. 3B, the grounding element 22 rises in the upper lamination direction away from the plasmon generator 16 in an upward section 22a. The grounding element 22 extends in a film surface direction away from the plasmon generator 16 in a lateral section 22b. The grounding element 22 further extends in the lower lamination direction in a downward section 22c, and connects the substrate 2.

The grounding element 22 is plasmon-coupled to the laser light propagating through the waveguide 15, and consumes the laser light. In other words, the grounding element 22 consumes (attenuates) a part of the laser light, decreases plasmon coupling efficiency between the waveguide 15 and the plasmon generator 16, and decreases generating efficiency of the near field light. Therefore, in order to restrain the generation of the plasmon coupling between the near field element 22 and the waveguide 15, it is preferred to separate the grounding element 22 from the waveguide 15 as much as possible. Described later in detail, a distance between the waveguide 15 and the grounding element 22 is preferably no less than approximately one-eighth of wavelength of the laser light propagating through the waveguide 15. By adjusting a length of the lateral section 22b, a distance between the downward section 22c of the grounding element 22 and the waveguide 15 can be sufficiently maintained. Therefore, practically, a distance D between the waveguide 15 and the upward section 22a of the grounding element 22 is preferably no less than one-eighth of the wavelength of the laser light.

In order not to inhibit the plasmon coupling between the waveguide 15 and the plasmon generator 16, it is preferred to make the grounding element 22 of a material having an absorption coefficient as small as possible with respect to the laser light. The absorption coefficient has wavelength dependency. Therefore, when laser light with wavelength of 800 nm is used, Ta, W, Fe, Ni and Cr are preferable materials in the order for at least a part of the grounding element 22, which is close to the waveguide 15. The part close to the waveguide 15 typically refers to the upward section 22a and the lateral section 22b, and further includes a part of the downward section 22c, the part being lateral to the waveguide 15. On the other hand, since the part near the substrate 2 in the downward section 22c is separated far enough from the waveguide 15, a limitation for the materials is small and any conductive materials can be used.

Referring to FIG. 1 again, the light source 31 is linked to the back surface 19 of the slider 1. The light source 31 is a laser diode. The light source 31 has a pair of electrodes 32a and 32b, clad layers 33a and 33b, and an active layer 34. The clad layers 33a and 33b are positive type (P type) or negative type (N type) respectively, and sandwiched by the electrodes. The active layer 34 is positioned between the clad layers 33a and 33b. A cleaved surface of the light source 31 has a reflector structure. The light source 31 is fixed to the slider 1 in an appropriate way. The active layer 34 that continuously oscillates the laser light and the waveguide 15 of the slider 1 are disposed on the same axial line. The laser light 40 generated in the active layer 34 enters into the waveguide 15. There is no restriction regarding the wavelength of the laser light 40, but a wavelength of approximately 800 nm is preferred.

Figure 4B:
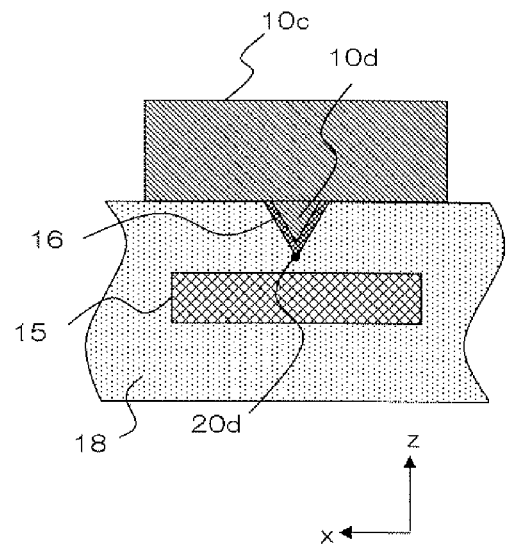

FIG. 4B is similar to FIG. 4A and shows another embodiment of the plasmon generator. The plasmon generator 16 of the present embodiment has a V-shaped cross section. The vertex of the V-shaped cross section is opposite to the waveguide 15. The propagation edge 20d is formed along the vertex of the V-shape. The plasmon generator 16 is formed by laminating either a metal or an alloy on a protrusion part 10d. The protrusion part has a triangular cross section of the main pole 10 that protrudes toward the substrate 2 side. The metal described above is selected from Au, Ag, Cu, Al, Pd, Ru, Pt, Rh or Ir, and the alloy described above is mainly composed of the metal(s). The plasmon coupling occurs in the propagation edge 20d, and the near field light generator is formed at the edge part of the ABS S side of the propagation edge 20d.

Figure 4C:
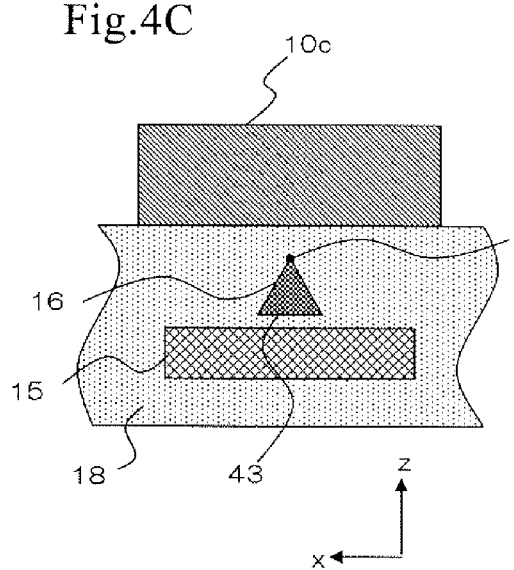

FIG. 4C is similar to FIG. 4A and shows another embodiment of the plasmon generator. The plasmon generator 16 of the present embodiment has a triangular cross sectional shape with one side 43 that is opposite to the waveguide 15, and has, as an overall outer shape, a triangular prism. Material(s) of the plasmon generator 16 are the same as the one of the embodiment shown in FIG. 4A. In the present embodiment, the plasmon coupling occurs in the propagation edge 20e formed along the vertex away from the waveguide 15. The plasmon coupling occurs in a propagation edge 20e being opposite to the main pole 10. The near field light generator is formed in edge part of the ABS S side of the propagation edge 20e. The clad layer 18 is between the plasmon generator 16 and the waveguide 15. However, the plasmon generator 16 and the waveguide 15 may be directly contacted.

Figure 4D:
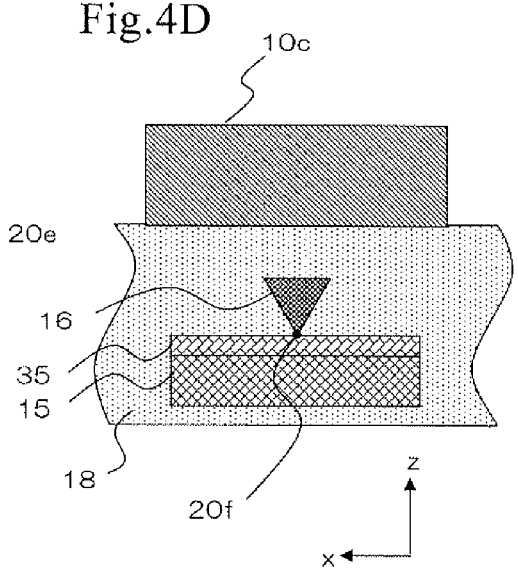

The FIG. 4D is similar to FIG. 4A and shows another embodiment of the plasmon generator 16. The shape and material(s) of the plasmon generator 16 of the present embodiment are the same as those of the embodiment shown in FIG. 4A. In the present embodiment, a buffer portion 35 is disposed between the plasmon generator 16 and the waveguide 15. The buffer portion 35 has a smaller refractive index than the waveguide 15 and is formed separately from the clad layer 18. The buffer portion 35 couples the laser light propagating through the waveguide 15 to the plasmon generator 16 in the surface plasmon mode. In the present embodiment, the plasmon coupling occurs in a propagation edge 20f that is opposite to the waveguide 15, and the near field light generator is formed in the edge part of the ABS S side of the propagation edge 20f.

(Examples) Initially, a magnetic recording element without a grounding element 22 is produced in the following order. An entire configuration of the slider is as shown in FIG. 1, in which a grounding element 22 is omitted. A plasmon generator 16 has a reverse triangular cross section as shown in FIG. 4A.
(1) A lower shield layer 9 was formed on a substrate 2 made of ALTIC, and an MR element 4 that is a reproducing element was formed on the lower shield layer 9.
(2) An upper shield layer 8 was formed on the MR element 4.
(3) A return shield layer 11 was formed.
(4) One part of a clad layer 18 made of $Al_2O_3$ was formed.
(5) A waveguide 15, that was a core layer (width 0.6 μm, thickness 0.5 μm) made of TaOx, was formed, and a lateral part of the waveguide 15 was filled with one part of the clad layer 18 made of $Al_2O_3$.
(6) Another of the clad layer 18 made of $Al_2O_3$ was formed above the waveguide 15. This part of the clad layer 18 functions as a dielectric body spacer layer intervening between the waveguide 15 and the plasmon generator 16.
(7) The plasmon generator 16 formed of Ag having an inverted triangular cross sectional shape was formed on the clad layer 18.
(8) The clad layer 18 made of $Al_2O_3$ was formed on the plasmon generator 16. This part of the clad 18 functions as a dielectric body spacer layer intervening between the plasmon generator 16 and a main pole 10.
(9) The main pole 10 and a coil layer were formed
(10) An overcoat layer 36 was formed.
(11) The wafer was cut into a row bar, lapped so that the ABS S was formed, and was cut as the slider 1.
(12) The slider 1 was joined with a suspension, and a head gimbal assembly was formed.
(13) A light source (a laser diode) 31 having wavelength of 800 nm and the waveguide 15 were linked.

In the present example, as shown in FIG. 2, distance D between the grounding element 22 and the waveguide 15 was defined as a distance of an upward section 22a in z-axis direction. As shown in FIG. 3B, a width W of the grounding element 22 was defined as a width of the upward section 22a in an x-axis direction. As shown in FIGS. 2 and 3B, a depth H of the grounding element 22 was defined as a length of the upward section 22a in a y-axis direction. The manufactured slider had a distance D of 0.25 μm between the grounding element 22 and the waveguide 15, a width W of 0.4 μm, and a depth H of 0.4 μm of the grounding element 22.

The manufactured slider was tested at a flying height above a magnetic recording medium and a laser light having a wavelength of 800 nm was introduced. Then magnetic information recording was performed. Outputs of a number of samples were observed under the same conditions. Though the same magnetic recording mediums were used, the outputs of samples were in wide range (see the row of "without grounding element" of Chart. 1). Generally, magnetic intensity and magnetic dispersion of a recording element are not affected by whether or not the laser light is introduced. Therefore, it is assumed that the variation of the outputs was caused by the variation of heating ability.

TABLE 1

| No. | Without Grounding Element mV | With Grounding Element mV |
| --- | --- | --- |
| 1 | 4.61 | 3.88 |
| 2 | 3.55 | 4.45 |

TABLE 1-continued

| No. | Without Grounding Element mV | With Grounding Element mV |
| --- | --- | --- |
| 3 | 0.21 | 4.89 |
| 4 | 1.85 | 5.10 |
| 5 | 3.15 | 2.88 |
| 6 | 4.62 | 2.90 |
| 7 | 2.88 | 4.49 |
| 8 | 1.11 | 4.60 |
| 9 | 1.08 | 4.22 |
| 10 | 0.62 | 4.42 |
| 11 | 3.95 | 3.83 |
| 12 | 2.00 | 3.92 |
| 13 | 2.49 | 5.00 |
| 14 | 3.77 | 3.84 |
| 15 | 2.88 | 4.29 |
| 16 | 0.08 | 4.77 |
| 17 | 1.50 | 4.71 |
| 18 | 2.63 | 4.50 |
| 19 | 3.63 | 4.81 |
| 20 | 4.01 | 4.19 |
| Average | 2.53 | 4.28 |
| Variance | 1.42 | 0.61 |
| Variance/Average | 0.56 | 0.14 |
| Normalized Average | 100 | 169 |
| Normalized Variance/Average | 100 | 25 |

The inventor of the present application concluded that the variation of shapes of the propagation edge of the plasmon generator 16 caused the above results. Next, films of Ag and Au having a film thickness of 200 nm respectively were formed on a silicon substrate, and the completed samples were heated at 300 for two hours. Then, a transformation of the surface roughness (Ra) was observed with an atomic force microscope (AFM). In the case of Ag, the surface roughness (Ra) observed immediately after film formation was 4.0 nm. On the other hand, the surface roughness (Ra) observed after heating was 8.1 nm. In the case of Au, the surface roughness observed immediately after film formation was 3.1 nm. On the other hand, the surface roughness observed after heating was 4.9 nm. Deterioration of the roughness were observed in the cases of both Ag and Au. This deterioration of the roughness affects linearity (degree of asperity) of the propagation edge 20c of the plasmon generator 16. It is assumed that the increase of the roughness is caused by grain growth (agglomeration) of Ag or Au by heating, and making the asperity of the propagation edge larger and deteriorating the linearity. Even if the asperity of the propagation edge is minutely changed in a nanometer range, it significantly affects the plasmon propagating efficiency. Computationally, when there is a lack of 20 nm on the propagation edge (in other words, when there is only asperity having 20 nm of depth), approximately 30% of the plasmon propagating loss occurs. In order to efficiently propagate the plasmon coupling to the near field light generator 16a that is at the tip part of the plasmon generator 16, it is important that the linearity of the propagation edge is maintained in a nanometer range. For these reasons, it is very important to maintain the roughness of the plasmon generator 16, especially in the propagation edge of the plasmon generator 16, as small as possible.

It is assumed that the following reasons cause this increase of the roughness: static electricity stores in the plasmon generator 16 by friction between the row bar and a grind stone during lapping; the static electricity is discharged and simultaneously generates heat. Accordingly, the inventor of the present application conceived a configuration connecting the grounding element 22 with the plasmon generator 16 that is in the electrically floating condition.

The grounding element 22 that connects the substrate 2 with the plasmon generator 16 is formed as follows. That is, in each of the pre-described steps (1)-(7), a through hole is sequentially formed at the same top plan position on the wafer as electrically connecting each part of the through hole. Therefore, different materials can be used for the grounding element 22 in each of the steps (1)-(7). In the present example, Ta was used for a part of the grounding element 22 that was in the vicinity of the waveguide 15.

Output of a slider with the grounding element 22 was measured in the same condition as the measurement of the slider without the grounding element 22. The results are shown in the "with grounding element" portion of Table 1. Due to settlement of the grounding element 22, the output increased by a factor of 1.7, and the dispersion decreased to one quarter.

When the grounding element 22 and the waveguide 15 are closed, a waste resonance (plasmon coupling) occurs between the waveguide 15 and the grounding element 22 (see portion denoted by "A" in FIG. 2). Therefore, a loss of light energy that propagates through the waveguide 15 increases. The shape of the grounding element 22 and the positional relation between the grounding element 22 and the waveguide 15 were changed, and the effects caused by the changes were observed.

Figure 5:
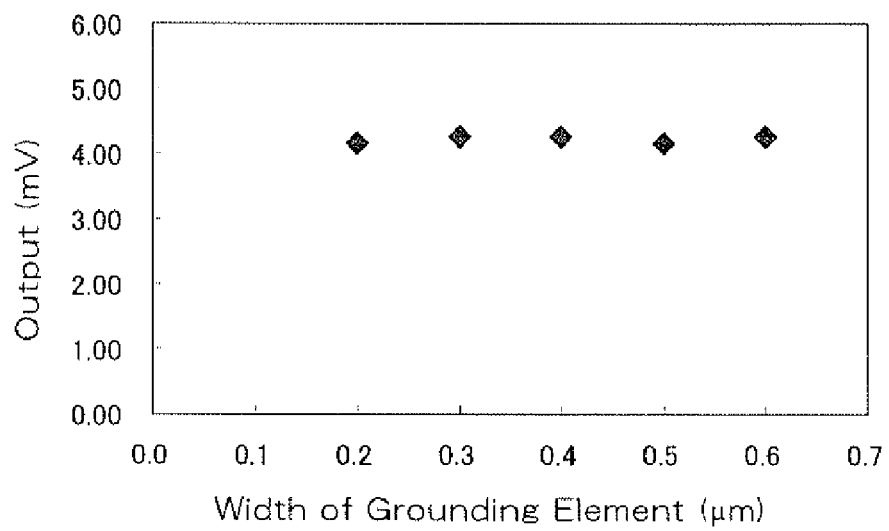
FIG. 5 is a graph showing a relation between a width of a grounding element and output.

Initially, five types of samples were made. For all five types, the distance D between the grounding element 22 and the waveguide 15 was fixed at 0.25 μm, and the depth H of the grounding element 22 was fixed at 0.4 μm. For each of the five samples, depth W of the grounding element 22 was changed in 0.1 μm increments from 0.2 μm to 0.6 μm (total 5 samples). Ten objects measure were made for each of the samples. The average value of the outputs was obtained. The results are shown in FIG. 5. The output varied little as the width was varied. That is because, in the present example, the laser light was coupled in the single mode although there are generally two types of propagating modes, a single mode and a multi-mode, with respect to the propagating form of the laser light through the waveguide. Further, in the embodiment, that is because the laser light was mostly present in the center of the waveguide 15, and the laser light did not substantially exist in both sides of lateral part of the waveguide 15. Additionally, the single mode is a propagating form of the laser light in which only a unique mode can exist in the waveguide with respect to laser light having a certain frequency. The multi-mode is a propagating form of the laser light in which no fewer than two modes including the basic mode and a high order mode exist in the waveguide.

Figure 6:
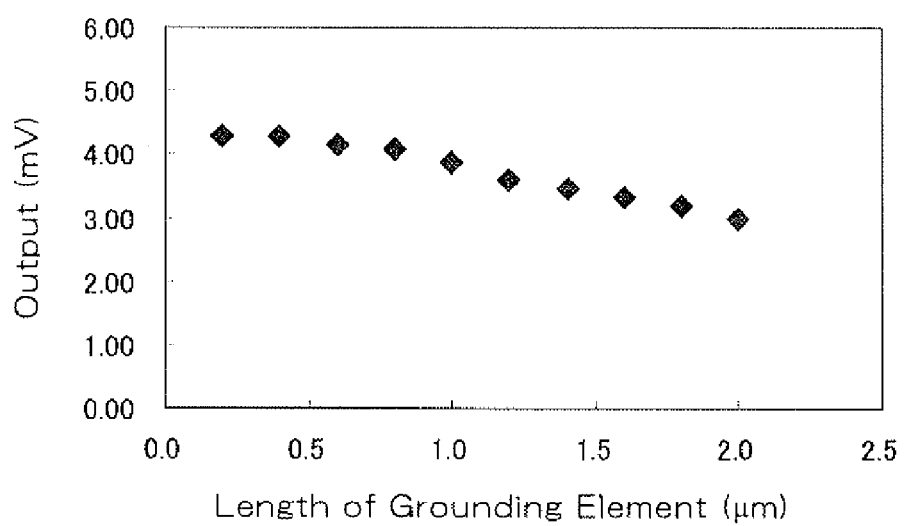
FIG. 6 is a graph showing a relation between a depth (shown as Length) of the grounding element and the output.

Next, ten types of samples were made. For all ten types, the distance D between the grounding element 22 and the waveguide 15 was fixed at 0.25 μm, and the width W of the grounding element 22 was fixed at 0.4 μm. For each of the ten types, each width H of the grounding element 22 was changed in 0.2 μm increments from 0.2 μm to 2.0 μm (total ten types of samples). Ten objects to measure were made for each type of samples, and average values of the outputs were observed. FIG. 6 shows the results. As the width H increased, the output decreased. It is assumed that a region between the waveguide 15 and the grounding element 22, where the plasmon coupling occurs, increases as the depth H increases.

Figure 7A:
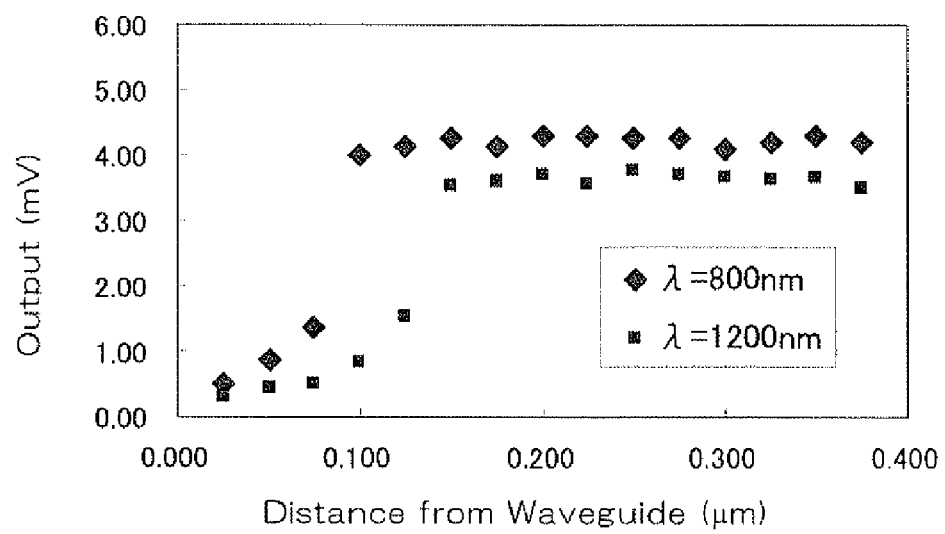
FIGS. 7A and 7B are graphs showing a relation between a distance from the grounding element to a waveguide and the output.
Figure 7B:
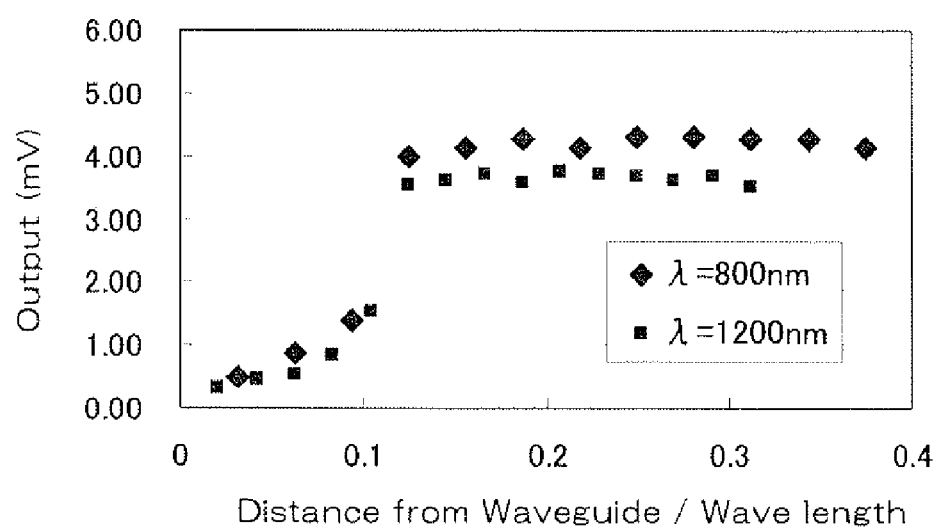

Next, fifteen types of samples were made. For all the fifteen types, the depth H of the grounding element 22 was fixed at 0.4 μm, and the width W of the grounding element 22 was fixed at 0.4 μm. For each of the fifteen types, each distance D of the grounding element 22 of the waveguide 15 was changed in 0.025 μm increments from 0.025 μm to 0.375 μm (total fifteen types samples). In this test, two types of laser light with wavelengths of 800 nm and 1200 nm respectively were used. Ten objects to measure were made for each type, and average values of the outputs of each of the samples were obtained. FIG. 7A shows the results. As the distance D between the grounding element 22 and the waveguide 15 was increased, the output increased. In the case of the laser light with a wavelength of 800 nm, the output dramatically increased at the distance D of 0.100 μm. In the case of the laser light with wavelength of 1200 nm, the output dramatically increased at the distance D of 0.150 μm. FIG. 7B is a plotted graph having a horizontal axis defined as "Ratio of Distance between Grounding Element And Waveguide with Respect to Wavelength of Laser Light (shown as Distance from Waveguide/Wavelength)." For any wavelength, when the "Ratio of Distance Between Grounding Element And Waveguide with Respect to Wavelength of Laser Light" exceeded one-eighth, the output dramatically increased. Therefore, by choosing "Ratio of Distance between Grounding Element And Waveguide with Respect to Wavelength of Laser Light" as a parameter, it is clear that a critical point not depending on the wavelength exists.

Penetration length of evanescent light "penetrating" from the waveguide 15 is written as formula (1) below, where a core wavelength of entering light is λ, a refractive index of the core layer is $n_1$, a refractive index of the clad layer is $n_2$, and an incident angle of the reflecting light with respect to the interface of the core layer and the clad layer is θ. Additionally, the penetration length d is defined as a distance at which an intensity of a penetrating electric field becomes $(1/e)^2$ of an intensity of an electric field at the interface of the core layer and the clad layer.

$$d = \lambda/2\pi\sqrt{n_1^2\sin^2\theta - n_2^2} \qquad \text{Formula (1)}$$

From formula (1), it is obvious that the penetration length d is proportional to the wavelength λ. Generally speaking, it is considered that an unnecessary plasmon coupling between the waveguide 15 and the grounding element 22 largely decreases when the grounding element 22 is separated by more than the penetration length d from the waveguide. Therefore, the penetration length d closely relates to the critical point (the critical point at which the output largely increases) of the distance D. Then, since the penetration length d is proportional to the wavelength λ, even if considered in a principle view, it is clear that the wavelength λ is proportional to the critical point of the distance D. Therefore, when the ratio of the distance D with respect to the wavelength λ of the laser light is chosen as a parameter, the wavelength becomes independent from the wavelength. Also, it can be understood that the output dramatically increases at one-eighth of the ratio. In conclusion, regardless of the wavelength of the laser light, it is preferred that the waveguide 15 and the grounding element 22 are separately disposed at an interval of one-eighth or more of the wavelength of the laser light.

Figure 8A:
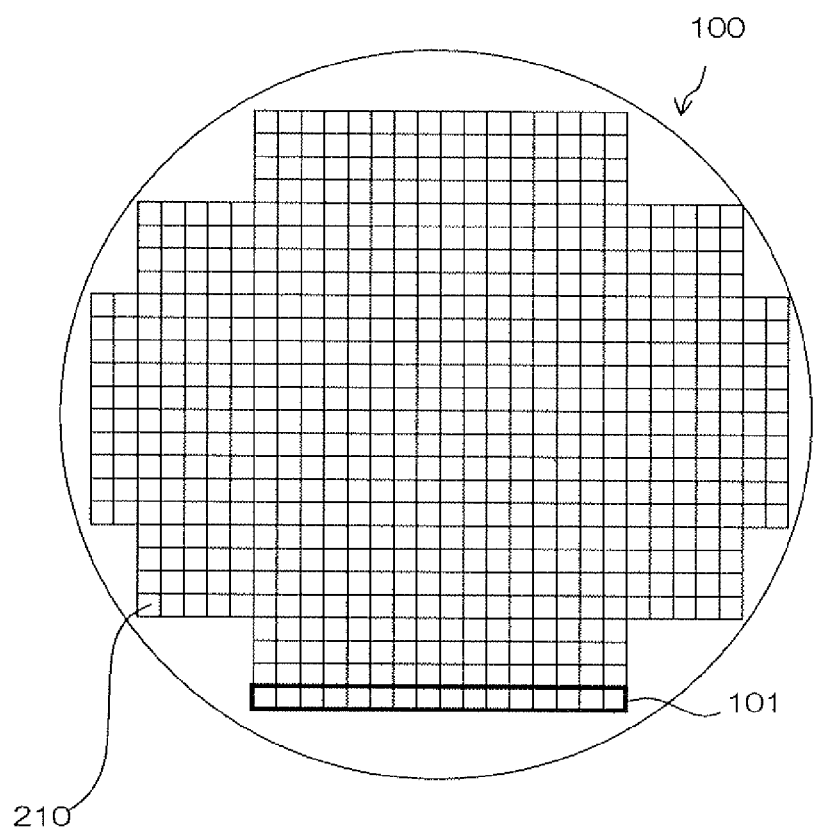
FIG. 8A is a top plan view of a wafer with respect to manufacture of the magnetic recording element of the present invention.
Figure 8B:
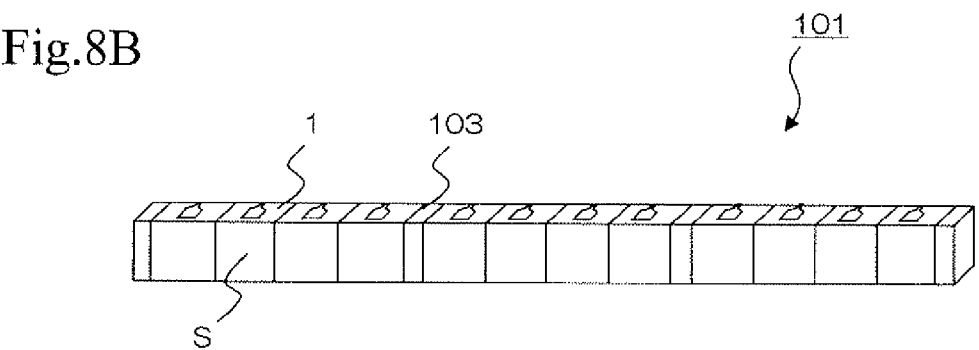
FIG. 8B is a perspective view of a row bar with respect to the manufacture of the magnetic recording element of the present invention.

Next, the wafer used in manufacturing the pre-described thin film magnetic head is explained. Referring to FIG. 8A, at least a stack 210 configuring the pre-described magnetic recording element 5 is laminated on a wafer 100. The wafer 100 is divided into a number of row bars 101. As shown in FIG. 8B, the row bar 101 includes a large number of the sliders 1. It is preferred that a measuring element 103 for controlling a lapping amount is formed between the sliders 1 in advance. The row bar 101 is a work unit of the lapping process for the ABS S. When the wafer is cut into the row bars 101, the ABS S appears along the cut plane of the wafer 100. Therefore, as described above, static electricity is likely stored in the vicinity of the ABS S of the slider 1 while the wafer is being cut into the row bars 101. The row bar 101 is further diced after the lapping process, and divided into the slider 1 including the magnetic recording element 5.

Figure 9:
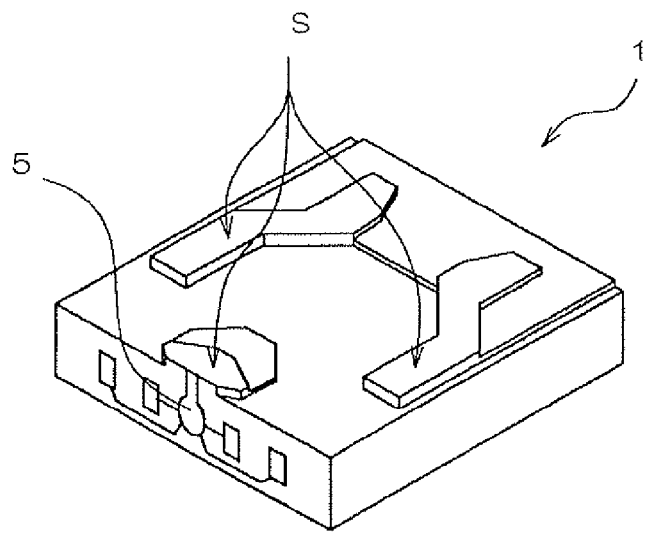
FIG. 9 is a perspective view of the slider of the present invention.

Referring to FIG. 9, the slider 1 has a nearly hexahedral shape. One face of the hexahedral shape is the ABS S being opposite to the magnetic recording medium 14.

Figure 10:
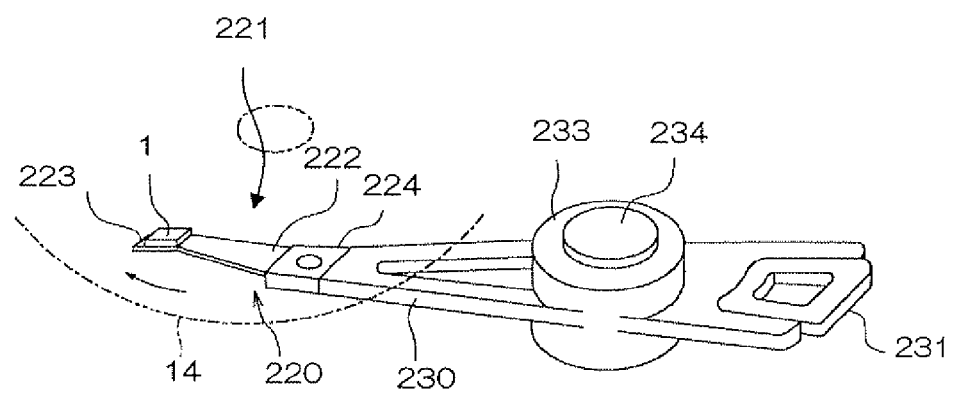
FIG. 10 is a perspective view of a head arm assembly including a head gimbal assembly in which the slider of the present invention is assembled.

Referring to FIG. 10, a head gimbal assembly 220 has the slider 1 and a suspension 221 elastically supporting the slider 1. The suspension 221 has a load beam 222, a flexure 223, and a base plate 224. The load beam 222 is formed in a plain spring shape and made of stainless steel. The flexure 223 is disposed in one edge part of the load beam 222. The base plate 224 is disposed in the other edge part of the load beam 222. The flexure 223 joins the slider 1 to give the slider 1 suitable flexibility. At the part of the flexure 223 to which the slider 1 is attached, a gimbal part is disposed to maintain the slider 1 in an appropriate position and posture.

The slider 1 is disposed in the hard disk device such that the slider 1 is opposite to the magnetic recording medium (hard disk) 14. The magnetic recording medium 14 is disk shaped and is rotatably driven. In FIG. 10, the magnetic recording medium (hard disk) 14 is positioned above the slider 1. When the magnetic recording medium 14 rotates in the arrow direction of FIG. 10, air flow passing between the magnetic recording medium 14 and the slider 1 generates a downward lifting force to the slider 1. The slider 1 flies from the surface of the magnetic recording medium 14 due to the lifting force.

Apart in which the head gimbal assembly 220 is mounted on an arm 230 is referred to as a head arm assembly 221. The arm 230 allows the slider 1 to move in the track crossing direction of the slider 1. One edge of the arm 230 is mounted on the base plate 224. On the other edge of the arm 230, a coil 231 is mounted, which forms one part of a voice coil motor. A bearing part 233 is disposed in the middle section of the arm 230. The arm 230 is rotatably supported by a shaft 234 mounted on the bearing part 233. The arm 230 and the voice coil motor for driving the arm 230 form an actuator.

Figure 11:
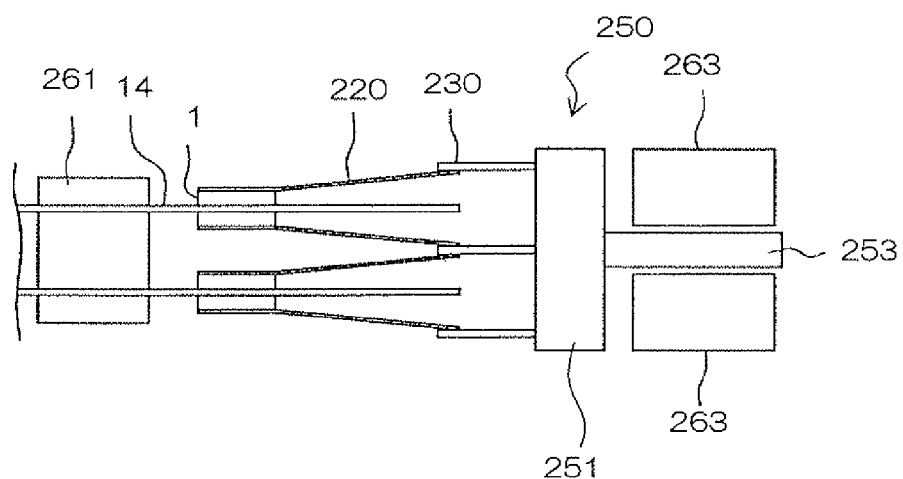
FIG. 11 is a side view of the head arm assembly in which the slider of the present invention is assembled.
Figure 12:
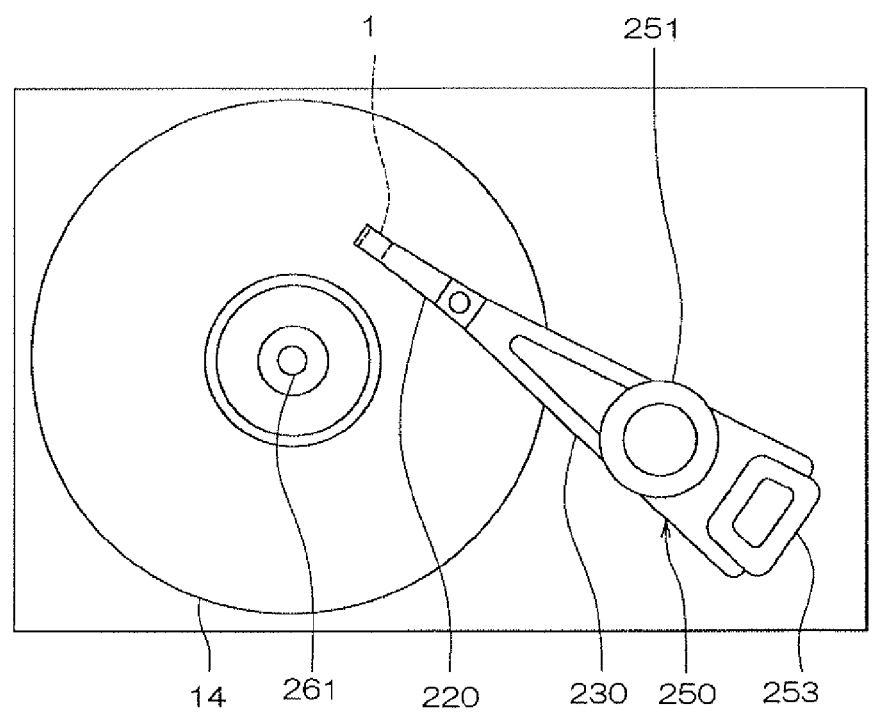
FIG. 12 is a top plan view of the hard disk device in which the slider of the present invention is assembled.

Next, descriptions of a head stack assembly into which the above-mentioned slider 1 is integrated and of a hard disk device are given below referring to FIG. 11 and FIG. 12. The head stack assembly includes a carriage having a plurality of arms, wherein a head gimbal assembly 220 is mounted on each arm. FIG. 11 is a side view of the head stack assembly. FIG. 12 is a top plan view of the hard disk device. The head stack assembly 250 includes a carriage 251 having a plurality of arms 230. On each arm 230, head gimbal assemblies 220 are mounted at an interval in the vertical direction. On the side of the carriage 251 opposite to the arm 230, the coil 253 is mounted, which forms a part of the voice coil motor. The voice coil motor has permanent magnets 263 disposed facing each other on both sides of the coil 253.

As shown in FIG. 12, the head stack assembly 250 is integrated into the hard disk device. The hard disk device has multiple magnetic recording mediums 14 mounted on a spindle motor 261. For each magnetic recording medium 14, two sliders 1 are disposed facing each other as sandwiching the magnetic recording medium 14. The head stack assembly 250, excluding the slider 1, and an actuator not only support the slider 1 but also position the slider 1 with respect to the magnetic recording medium 14. The slider 1 is moved in the direction crossing the track of the magnetic recording medium 14 by the actuator, and is positioned with respect to the magnetic recording medium 14. The slider 1 records information on the magnetic recording medium 14 by a recording head and reproduces the information recorded on the magnetic recording medium 14 by a reproducing head.

A description of the preferred embodiment according to the present invention was given above in detail. However, it should be appreciated that a wide variety of alterations and modifications are possible as far as they do not depart from the spirit and scope of the attached claims.

What is claimed is:

1. A magnetic recording element comprising:
    a substrate;
    a main pole for recording that includes an edge part positioned on an air bearing surface (ABS);
    a waveguide through which a laser light propagates;
    a plasmon generator that is positioned away from the substrate, that extends to the ABS as facing a part of the waveguide, and that has a propagation edge extending in a longitudinal direction,
    the propagation edge has an overlapping part and a near field light generator, the overlapping part overlapping the waveguide in the longitudinal direction, the near field light generator positioned on the ABS and located in the vicinity of the edge part of the main pole, the overlapping part of the propagation edge coupled with the laser light propagating through the waveguide in a surface plasmon mode so that a surface plasmon is generated, the propagation edge propagating the surface plasmon generated in the overlapping part to the near field light generator; and
    a grounding element that electrically connects the plasmon generator and the substrate without grounding through the main pole.

2. The magnetic recording element according to claim 1, wherein
    the plasmon generator has a V-shaped cross section of which a vertex is opposite to the waveguide, and
    the propagation edge is formed along the vertex, 3. The magnetic recording element according to claim 1, wherein
    the plasmon generator has a triangular cross section of which a vertex is opposite to the waveguide, and
    the propagation edge is formed along the vertex.

4. The magnetic recording element according to claim 1, wherein
    the plasmon generator has a triangular cross section of which a side is opposite to the waveguide, and
    the propagation edge is formed along a vertex that is away from the waveguide.

5. The magnetic recording element according to claim 1, wherein
    the grounding element is separated from the waveguide at a distance of no less than one-eighth of the wavelength of the laser light that propagates through the waveguide.

6. The magnetic recording element according to claim 1, wherein
    the grounding element is electrically connected to the plasmon generator on an edge surface opposite to the ABS, and extends to the substrate as changing its direction and separating from the plasmon generator.

7. A slider comprisin agnetic recording element of claim 1.

8. A wafer on which a stack is formed, the stack comprising the magnetic recording element of claim 1.

9. A head gimbal assembly comprising the slider of claim 7 and a suspension elastically supporting the slider.

10. A hard disk device comprising the slider of claim 7, further comprising a device positioning the slider with respect to a recording magnetic medium as well as supporting the slider.

* * * * *